Patented Aug. 31, 1943

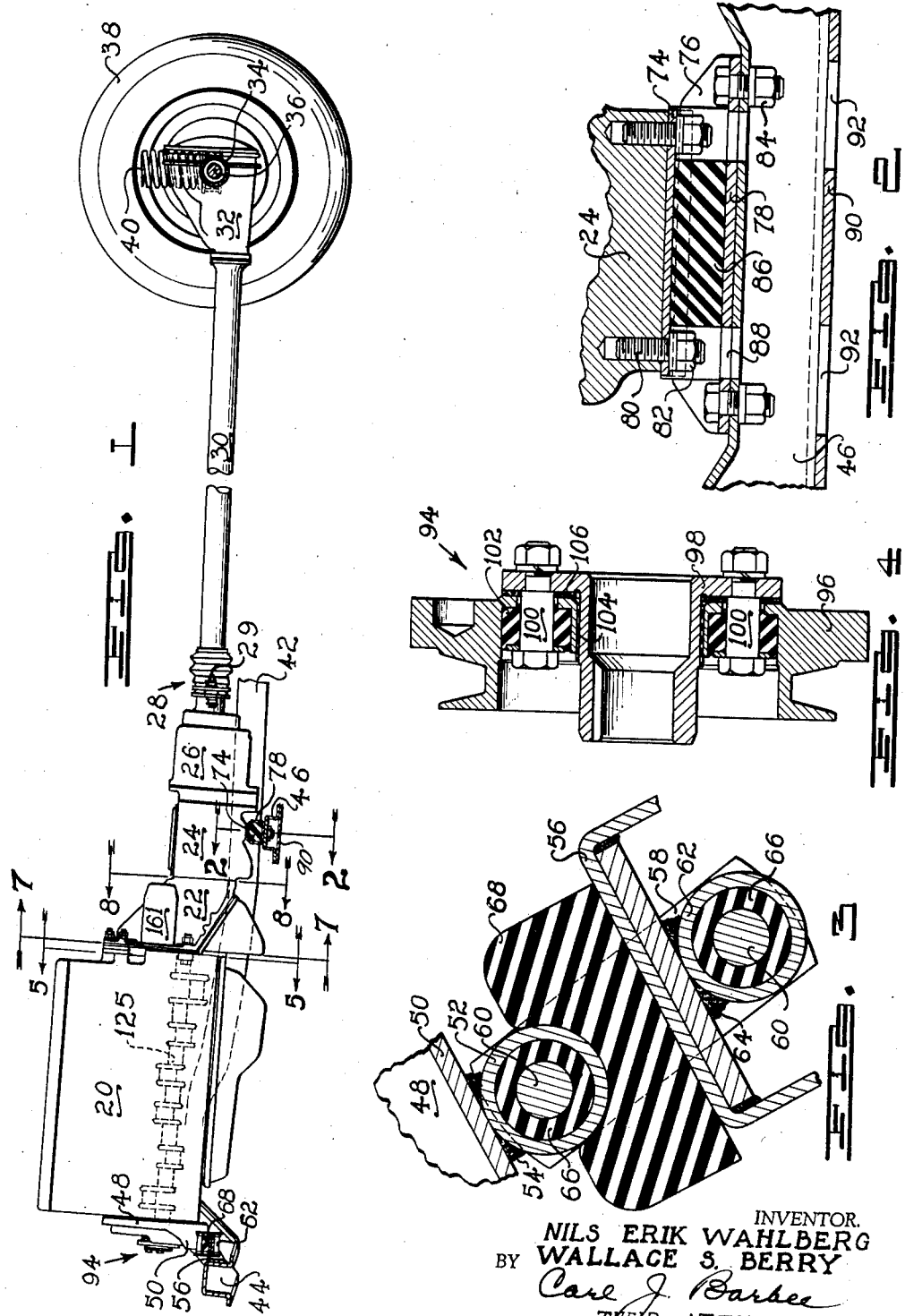

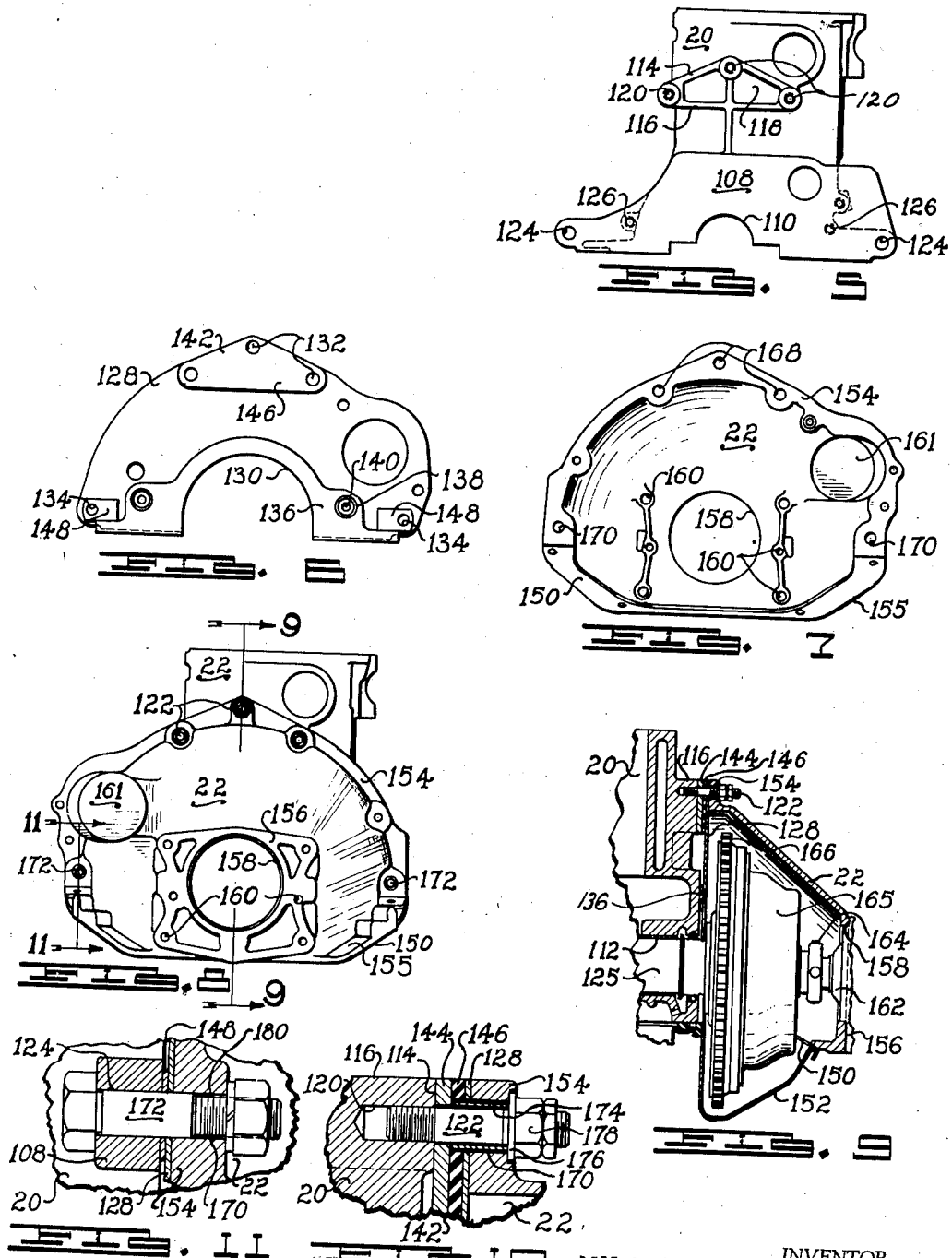

2,328,518

UNITED STATES PATENT OFFICE 2,328,518

CLUTCH HOUSING INSULATOR

Nils Erik Wahlberg, Chicago, Ill., and Wallace S. Berry, Kenosha, Wis., assignors to Nash-Kelvinator Corporation, Kenosha, Wis., a corporation of Maryland Application December 27, 1941, Serial No. 424,622

8 Claims. (Cl. 180—64)

This invention relates to driving units for automotive vehicles and has particular reference to means for connecting the motor and clutch of an automobile.

It is an object of this invention to provide means for connecting the motor and clutch of an automobile to prevent the transmission of noise between the motor and clutch housing of the automobile.

It is another object of this invention to provide means for dampening vibrations set up in the clutch housing of an automotive driving unit.

It is another object of this invention to provide a flexible insert between the rigid motor and rigid clutch housing of an automotive vehicle.

Other objects and advantages of this invention will be apparent from a consideration of the following description and claims and the attached drawings, of which there are two sheets, and in which—

Figure 1 represents a side elevational view of the driving unit of an automotive vehicle as attached to the frame members of the vehicle;

Figure 2 represents a sectional view taken along a plane indicated by the line 2—2 in Figure 1 and looking in the direction of the arrows;

Figure 3 represents a longitudinal sectional view through one of the front motor supports illustrated in Figure 1;

Figure 4 represents a longitudinal sectional view through the vibration dampener illustrated in Figure 1;

Figure 5 represents a rear elevational view of the motor block and is taken along a plane indicated by the line 5—5 in Figure 1 and looking in the direction of the arrows;

Figure 6 represents a front elevational view of the plate attached to the rear of the motor block;

Figure 7 represents a front elevational view of the clutch housing and is taken along a plane indicated by the line 7—7 in Figure 1 and looking in the direction of the arrows;

Figure 8 represents a rear elevation of the clutch housing as attached to the motor block and is taken along a plane indicated by the line 8—8 in Figure 1 and looking in the direction of the arrows;

Figure 9 represents a vertical longitudinal sectional view through the clutch housing and rear portion of the motor block and is taken along a plane indicated by the line 9—9 in Figure 8 and looking in the direction of the arrows;

Figure 10 represents an enlarged detailed view of the connection between the top of the clutch housing and the motor block shown in Figure 9; and Figure 11 represents a sectional view through the connection between the lower portion of the clutch housing and the motor block and is taken along the plane indicated by the line 11—11 in Figure 8 and looking in the direction of the arrows.

Numerous efforts have been made in recent years to reduce the noise emanating from internal combustion motors and to prevent the transmission of this noise to the bodies of automobiles in which the motors are installed. It is generally believed that a considerable amount of this noise is caused by the small deflections in the crankshaft of the automobile which cause the crankshaft to break through the oil film in the bearings which support the crankshaft. The resulting contact between the crankshaft and the bearings produces a knocking noise which is transmitted through the various parts of the motor and driving unit to the automobile body and which may reach an undesirable, audible level. A great deal of the noise is believed to be caused by dynamic vibrations in the flywheel and vibration dampener which are usually attached to opposite ends of the crankshaft and which form weights supported on the free ends of the crankshaft overhanging the bearings. These weights tend to bend the crankshaft and the tendency is greatly increased by any dynamic unbalance in the weights when rotated at high speed. This is particularly true of vibration dampeners which are purposely unbalanced to counteract torsional vibrations in the crankshaft.

In an effort to control this noise, it has been the practice to mount the motor block and driving unit of the automobile on the frame of the automobile by means of rubber or other deformable cushions. However, it has been found that if the rubber cushions are made soft enough to dampen the relatively high frequency noises in the motor, they will be too soft to adequately support the motor and will permit the entire motor to rock, thus imparting new vibrations to the automobile.

Applicants have found that even the most effective motor mounts do not prevent noise from reaching the body of the automobile and have concluded that a large percentage of the total noise is air borne from the clutch housing which has a relatively large curved surface and acts as a bell to radiate sound waves. These sound waves are believed to be caused by the knocking vibrations in the motor just described and also by natural frequency vibrations of the clutch housing set up by transmitting the motor vibrations to the housing.

This invention proposes to insulate the motor block from the remainder of the driving unit and particularly the clutch housing by means of a flexible insert between the motor block and the clutch housing and thus prevent the noises from being transmitted from the motor block to the clutch housing from where they may be transmitted to the remainder of the automobile either through direct material contact or by air borne sound waves. It is believed that this insulation also acts to dampen natural frequency vibrations in the clutch housing itself and prevent the clutch housing from acting as a bell and emitting air borne noises.

With the above general description in mind, attention is called to Figure 1 of the drawings which illustrates an internal combustion motor 20 to the rear end of which is attached a clutch housing 22. The rear of the clutch housing is connected to a change speed gear case 24 which is in turn connected to an overdrive gear case 26. The overdrive gear case is connected through a flexible joint generally indicated at 28 to a torque tube 30 which encloses a propeller shaft and extends backwardly to the differential housing 32. The joint 28 includes horizontally spaced bolts 29 and is arranged to transmit thrust loads between the torque tube and the overdrive housing. The joint is more particularly described and claimed in the co-pending application of Nils Erik Wahlberg for a Torque tube drive, Serial No. 336,604, filed May 22, 1940, which issued as Patent No. 2,311,143, February 16, 1943.

The differential housing carries the rear axle housings 34 within which is enclosed the rear axle 36 for driving the rear wheels 38. Coil springs 40 are mounted on the rear axle housing for supporting the body of the automobile over the rear wheels.

It will be noted that the motor 20, clutch housing 22, transmission housing 24 and overdrive housing 26 form a relatively rigid unit which is supported upon the frame members 42 by means of a front cross member 44 and a rear cross member 46. The connection between the motor and the front cross member 44 is more clearly illustrated in Figure 3 and consists of a plate 48 secured to the front of the motor block. The plate 48 is provided with a forwardly extending flange 50 to the underside of which are secured tubes 52 which extend longitudinally of the motor on each side thereof. The tubes 52 are secured to the flange 50 as by welding at 54 and are connected to brackets 56 carried on the cross member 44 by a joint which is more clearly illustrated in Figure 3.

The connection between the tube 52 and the bracket 56 consists of a pair of flat links 58, the ends of which are attached to bolts 60 passed through the tube 52 and a similar tube 62 welded to the underside of the bracket 56 as at 64. Sleeves 66 of rubber or other deformable material are positioned around the bolts 60 and within the tubes 52 and 62. The sleeves 66 extend beyond the ends of the tubes and are compressed between links 58 which are positioned one at each end of the tubes when the bolts 60 are tightened. The end compression on the sleeves 66 expands their center sections to tightly grip the bolts 60 and the insides of the tubes 52 and 62. A rubber block 68 is positioned between the top of the bracket 56 and the tube 52 to assist the links 58 in supporting the motor.

The connection between the transmission housing 24 and the rear cross member 46 is more clearly disclosed in Figure 2 and consists of a downwardly opening, channel shaped bar 74, the flanges of which are nested within the upturned flanges 76 of a lower bar 78. The upper bar is secured to the underside of the transmission housing by means of stud bolts 80 and nuts 82 while the lower bar 78 is secured to the top of the cross member 46 by the bolts 84. Rubber or other deformable material 86 is positioned between the upper and lower bars 74 and 78 and is preferably bonded thereto to insulate the bars from each other and prevent a metal to metal connection between the transmission housing 24 and the cross member 46. The upper wall of the cross member 46 and the lower wall of the bar 78 are apertured as at 88 to permit access to the nuts 82 for securing the upper bar 74 to the transmission housing 24. The plate 90 which closes the rear cross member 46 to form a hollow box section is also apertured at 92 to permit access to both the nuts 82 and the bolts 84.

The motor 20 is provided at its forward end with a torsional vibration dampener generally indicated at 94, the construction of which is more particularly indicated in Figure 4 and which consists of a statically unbalanced annular inertia member 96 connected to an inner hub member 98 by means of the bolts 100. The bolts 100 extend through rubber biscuits 102 positioned in pockets in the inertia member 96 and the inertia member is insulated from the hub 98 by a sleeve 104 of rubber and a disc 106 of friction material so that there is no metallic contact between the inertia member and the hub. The inertia member 96 is thus permitted to rotate slightly relative to the hub 98 which is securely fastened to the crankshaft. The construction and operation of the vibration dampener is more clearly described and claimed in the co-pending application of Nils Erik Wahlberg and Floyd F. Kishline, for a Vibration dampener, Serial No. 401,982, filed July 11, 1941.

Considering now the connection between the rear end of the motor block 20 and the clutch housing 22, attention is called to Figures 5 through 11 which disclose the motor block to be provided with a lower vertical face 108 in which is cut the semi-cylindrical notch 110 for receiving the upper half of the rear main bearing 112. Spaced upwardly from the lower face 108 is an upper face 114 formed on a pad 116 cast on the rear of the motor block. The pad 116 may be hollowed out as at 118 in order to lighten the motor block and is provided with three apertures 120 which are tapped to receive the stud bolts 122.

The lower face 108 extends laterally to each side of the main portion of the motor block and is provided with spaced apertures 124 which are positioned approximately along a horizontal line extending through the axis of the crankshaft 125. Other apertures 126 are provided for a purpose which will be described presently.

The faces 108 and 114 are arranged to support the plate 128 which is provided with a semi-circular cutout 130 to clear the crankshaft and with apertures 132 registering with the apertures 120 in the upper face 114 of the motor block and spaced apertures 134 registering with the apertures 124 in the lower face of the motor block.

Secured along the lower edge of the plate 128 and around the semi-circular notch 130 is a gasket 136 of rubber or other deformable material which is designed to prevent dirt from passing between the plate and the lower face 108 to the bearing 112. The gasket 136 is cut away as at 138 around apertures 140 which register with the apertures 126 in the motor block and through which screws may be passed to support the plate 128 on the motor block during the process of assembling the motor and clutch mechanism.

The upper part of the plate 128 carries a pad 142 which extends between and around the apertures 132. The pad 142 consists of a metal plate 144 which is spaced from the plate 128 by a thin strip 146 of rubber or other deformable material preferably bonded to plates 128 and 144. The purpose of the upper pad 142 will be described presently. It should be noted that the plane of the upper face 114 of the motor block is parallel to the lower face 108 but is displaced forwardly therefrom to make room for the pad 142 and permit the plate 128 to lie parallel to each face.

The plate 128 is also provided with metal pads 148 which are secured as by welding to the plate and are provided with apertures concentric with the apertures 134 in the lower edge of the plate 128.

The clutch housing 22 is formed as a casting and is generally bell shaped with the lower portion being cut off along a plane 150 to which the clutch pan 152 is attached in the normal fashion.

The clutch housing 22 is provided with a flange 154 around the forward edge thereof which joins with a flange 155 along the plane 150 and is furthere provided with a flat rear face 156 defining the aperture 158 and holes 160. The flange 154 corresponds to the rim, and the rear face 156 to the base, of a bell to which the acoustic properties of the housing may be compared. The aperture 158 receives the clutch shaft bearing 162 (see Figure 9) and the holes 160 are arranged to pass bolts by means of which the transmission housing 24 is secured to the rear face 156. A hollow cylindrical boss 161 is integrally cast with the clutch housing 22 and is arranged to enclose a starter gear and shaft (not shown) for engagement with the flywheel 166.

The clutch shaft bearing 162 extends forwardly from the transmission housing 24 through the aperture 158 and supports the clutch shaft and the clutch throw out collar 164 while the remainder of the clutch mechanism 165 is supported in the normal fashion on the flywheel 166 secured to the rear end of the crank shaft 125. The construction of the clutch mechanism does not form a part of this invention and may be of any standard type known to the automotive art today.

The flange 154 around the clutch housing 22 is provided with three apertures 168 which are arranged to match with the apertures 132 in the plate 128 and the apertures 120 in the motor block 20. The flange 154 is also provided with horizontally spaced apertures 170 which are arranged to align themselves with the apertures 134 in the plate 128 and the apertures 124 in the lower face of the motor block. Stud bolts 122 extend from the motor block 20 through the apertures 132 in the plate 128 and apertures 168 at the top of the clutch housing 22 and bolts 172 are passed through the apertures 170 at the lower side of the clutch housing, apertures 134 in the plate and apertures 124 in the lower face of the motor block 20. These connections are more clearly illustrated in Figures 10 and 11.

Figure 10 illustrates the aperture 170 in the clutch housing 22 to be larger than the stud bolt 122 so that a sleeve 174 may be positioned telescopically around the bolt 122 and extend between the surface of the plate 144 and the washer 176 which abuts against the nut 178 on the stud bolt 122. Thus the sleeve 174 limits the compression that can be put on the rubber strip 146 by tightening the nut 178.

The lower edge of the clutch housing 22 is secured to the laterally extending portion of the lower face 108 of the motor block 20 by the bolts 172 which are extended through the apertures 124 in the lower face 108, the apertures 134 in the plate 128 and through the apertures 170 in the flange 154 of the clutch housing. Attention is called to the fact that the bolts 172 are reduced in diameter as at 180 so that there is clearance between the threaded portion of the bolts and a portion of the flange 154 through which the bolts extend. Attention is also called to the fact that the metal pads 148 secured to the plate 128 space the front surface of the plate 128 from the rear face of the motor block. It is this space that the gasket 136 is arranged to seal.

In operation, the direct metal contact from the lower rear face 108 of the motor block 20 through the pads 148 to plate 128 to flange 154 of the clutch housing 22 will transmit driving and braking thrust between the motor block and clutch housing and will maintain the parts in proper longitudinal alignment. The upper edge of the flange 154 may slide over the sleeves 174 and studs 122 within the limits of the compressibility of the rubber 146 and the clutch housing 22 will thus rock slightly about a horizontal axis through the crankshaft 125 and pads 148.

It is believed that the connection between the motor block and clutch housing just described operates in a dual capacity to reduce the area of metal to metal contact between the motor block and the clutch housing and thus reduce the area through which noise and vibrations from the motor may be transmitted directly to the clutch housing for transmission to the rear motor support and radiation from the bell surface of the clutch housing and to also act as a dampener on the free edge of the clutch housing to dampen the natural vibrations of the housing. It should also be noted that the flexible connection will also act in the manner just described to prevent sound from traveling in a reverse path from the clutch housing to the motor block and front motor mountings.

While we have described our invention in some detail, we intend this description to be an example only and not as a limitation of our invention, to which we make the following claims:

1. In combination with a motor block having a crankshaft therein, parallel faces formed on said block normal to said crankshaft and offset longitudinally from each other, a plate supported from said faces, rigid pads positioned along a line transverse to said crankshaft and spacing said plate from one of said faces, a flexible pad spacing said plate from the other of said faces, gasket means positioned between said plate and said one face and extending around the end of said crankshaft, a generally bell-shaped clutch housing having a flange around the rim thereof and positioned against the opposite side of said plate from said block, means clamping said flange to said block along the line of said rigid pads, and other means clamping said flange to said block adjacent to said flexible pad.

2. In combination with a motor block having a crankshaft therein, parallel faces formed on said block normal to the axis of said crankshaft and offset longitudinally from each other, a plate secured to one of said faces, a pad secured to said plate and arranged to abut against other of said faces, said pad including flexible material, a generally bell-shaped clutch housing having a flange around a portion of the rim thereof and positioned against said plate on the opposite side of said plate from said block, means clamping said housing to said block along a line passed horizontally and normally through said crankshaft, and means extending through said pad on said plate for clamping said flange to said block.

3. In combination with a motor block having a crankshaft therein, parallel faces formed on said motor block normal to the axis of said crankshaft and offset longitudinally from each other, a plate, rigid pads having a relatively small area compared to the area of said plate and secured to said plate, said pads being positioned along a line extending transversely of said plate, a flexible pad secured to said plate and spaced from the line of said rigid pads, means securing said plate to said block with said rigid pads positioned against one of said faces and on opposite sides of said crankshaft, said flexible pad engaging the other of said faces, a generally bell-shaped clutch housing having a flange around a portion of the rim thereof and positioned against said plate on the opposite side of said plate from said block, means positioned along the line of said rigid pads for clamping said housing to said block, and other means extending through said flexible pad for clamping said flange to said block.

4. In combination with a motor block and a clutch housing, means for clamping said block and housing together comprising a bolt extending between said block and housing, a deformable pad positioned between said block and housing and around said bolt, and a sleeve positioned telescopically around said bolt and spacing the shank of said bolt from said housing for limiting the degree to which said pad may be compressed between said block and housing.

5. Means for securing a clutch housing to a motor block comprising a deformable pad carried between said block and said housing, clamping means for drawing said housing toward said block, and spacer means extending between said clamping means and said block for limiting the compression of said flexible pad.

6. A connection between a motor block member and a clutch housing member comprising a deformable pad positioned between said members, a rigid connecting member secured to one of said first mentioned members, clamping means carried by said connecting member and engageable with the other of said first mentioned members, and spacer means positioned between said clamping means and one of said first mentioned members.

7. In combination with a motor block having a crankshaft, a generally bell-shaped clutch housing, means securing said housing to said block along a horizontal line passed transversely through the axis of said crankshaft, other means securing the edge of said housing to said block at a point removed from the line of said first connecting means, and flexible means positioned between said housing and said block and around said other means.

8. A connection between a motor block and a clutch housing comprising means along a first portion of the juncture between said motor block and housing forming a fulcrum about which said block and said housing are free relatively to rock, a cushion interposed between said housing and block at another portion of the juncture and opposite said first portion in order relatively to space and insulate said block and housing, and means between said block and housing serving to compress said cushion and limit the separating movement thereof.

NILS ERIK WAHLBERG.
WALLACE S. BERRY.